Sept. 21, 1971    D. W. CHANEY    3,606,830
STATIONARY REFUSE PACKER AND ASSOCIATED CONTAINER APPARATUS
Filed Feb. 19, 1969    10 Sheets-Sheet 1

INVENTOR.
DONAL W. CHANEY
BY
Schmieding & Sultz
ATTORNEYS

Sept. 21, 1971  D. W. CHANEY  3,606,830
STATIONARY REFUSE PACKER AND ASSOCIATED CONTAINER APPARATUS
Filed Feb. 19, 1969  10 Sheets-Sheet 2

INVENTOR.
DONAL W. CHANEY
BY
Schmieding & Fultz
ATTORNEYS

Sept. 21, 1971  D. W. CHANEY  3,606,830
STATIONARY REFUSE PACKER AND ASSOCIATED CONTAINER APPARATUS
Filed Feb. 19, 1969  10 Sheets-Sheet 4

INVENTOR.
DONAL W. CHANEY
BY Schmieding & Fultz
ATTORNEYS

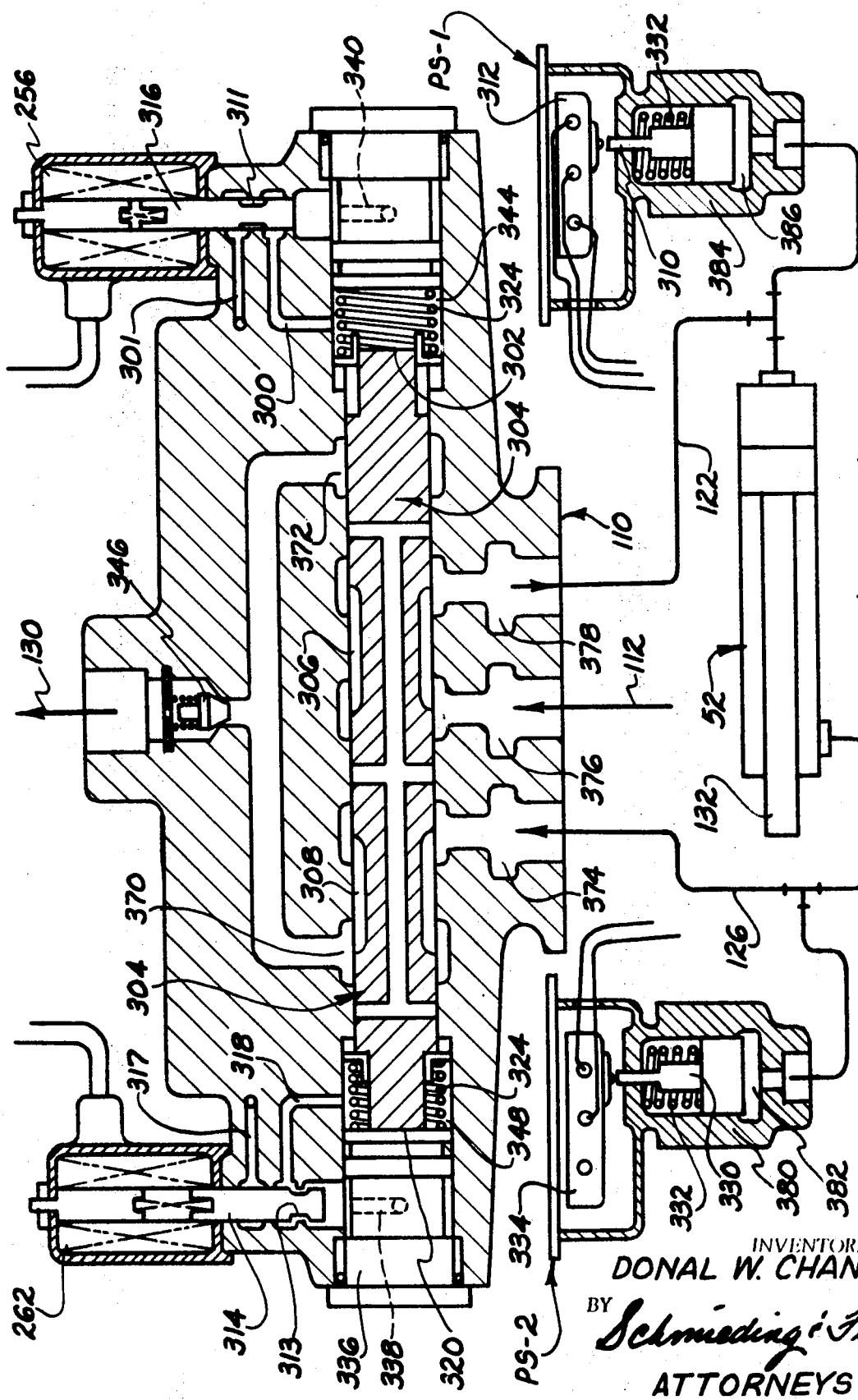
Fig. 10-A.

INVENTOR.
DONAL W. CHANEY

United States Patent Office 3,606,830
Patented Sept. 21, 1971

3,606,830
**STATIONARY REFUSE PACKER AND ASSOCI-
ATED CONTAINER APPARATUS**
Donal W. Chaney, Galion, Ohio, assignor to
Harsco Corporation, Harrisburg, Pa.
Filed Feb. 19, 1969, Ser. No. 800,656
Int. Cl. B30b 15/16
U.S. Cl. 100—52                         10 Claims

ABSTRACT OF THE DISCLOSURE

A stationary refuse packer and associated portable refuse container apparatus that comprises a novel automatic control system adapted for sophisticated control of the packer ram that loads the container. Such control includes jog type cycling wherein portions of the packer ram cycle can be precisely individually controlled; single cycling wherein the machine will go through one complete cycle and then stop; automatic cycling wherein the machine will cycle continuously until stopped; and timer cycling wherein the machine will continue to cycle until automatically stopped after a predetermined period of time. In addition, other aspects of control can be uniquely accomplished.

---

This invention relates to refuse handling apparatus, and more particularly to portable refuse containers and associated stationary packer apparatus for loading such containers.

In general the present invention relates to an automatically controlled stationary refuse packer and associated refuse container apparatus and system of the type wherein large portable refuse containers to be loaded are detachably connected, one at a time when empty, to a stationary packer with a load receiving opening of the container registered with a load discharge opening of the packer.

The refuse to be transported to a dump site is loaded into a load receiving opening in the top of the packer so as to fall into a horizontally extending packer passage wherein an associated reciprocating packer ram cyclically delivers the refuse to said container being loaded with compacting action so as to compress the load in the container and thereby achieve maximum load carrying capacity for the container.

In accordance with the present invention the apparatus is provided with a novel packer and associated control means that includes three ram control switch means that individually separately control basic movements of the packer ram, and a selector switch means that controls operation of said three ram control switch means.

It is another aspect of the present invention to provide the apparatus with both a main packer control means and an auxiliary console packer control means, said console packer control means serving to provide more sophisticated control of said packer ram such as jog type cycling wherein portions of the packer ram cycle can be precisely individually controlled; single cycling wherein the machine will go through one complete cycle and then stop; automatic cycling wherein the machine will cycle continuously until stopped; and timer cycling wherein the machine will continue to cycle until automatically stopped after a predetermined period of time.

As still another aspect of the present invention the apparatus when operated with single cycling and timer cycling is adapted to automatically continue movement of the packer ram to the end of a retraction before the machine is automatically stopped, unless the packer ram is intentionally immediately stopped in any existing position by a stop switch.

As another aspect of the present invention, when the machine is operating during any of the above mentioned cycling operations, the actuation of a packout switch means will always cause the packing ram to stop after it has reached an extended packout position.

It is, therefore, an object of the present invention to provide a novel stationary refuse packer apparatus and associated control means that provides individual control of various portions of a packer ram cycling.

It is another object of the present invention to provide a novel stationary refuse packer and associated main and auxiliary control means that provide not only individual control of portions of a packer ram cycle, but also more sophisticated automatic control of various types of cycling operation of the packer ram.

It is another object of the present invention to provide a novel stationary refuse packer and associated main and auxiliary control means wherein the packer ram of the apparatus is automatically returned and stopped at certain positions of its cycle depending on the occurence of certain phases of operation of the control system.

Figure 10:
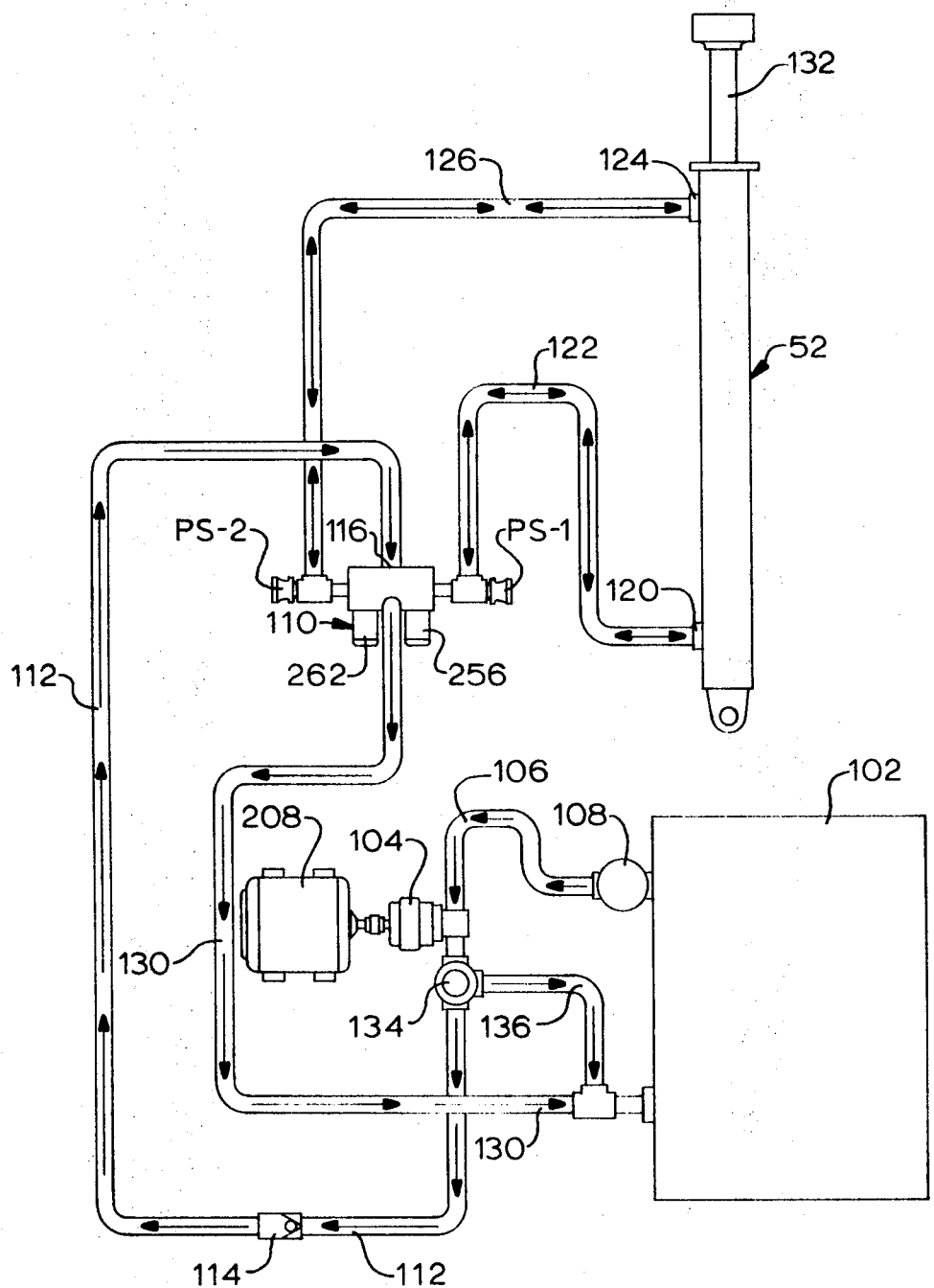
FIG. 10 is a diagrammatic view of a hydraulic apparatus forming a portion of the control system of the present invention.
Figure 13:
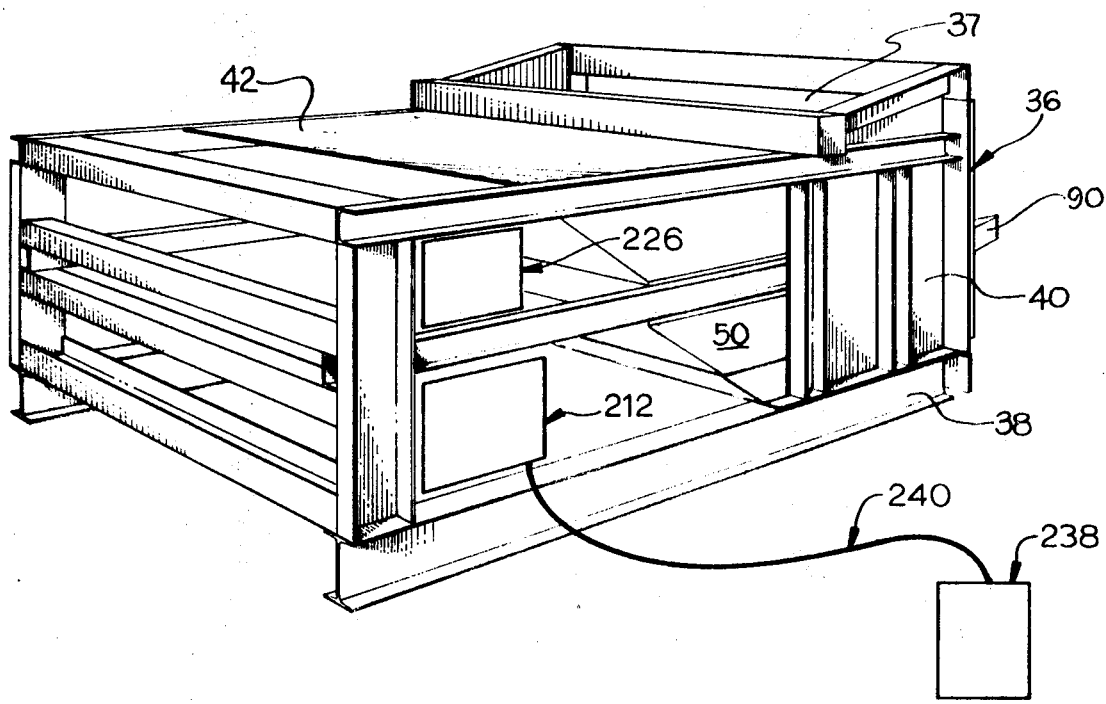

FIG. 10–A is a diagrammatic view partially in section of a control valve and pressure responsive switch apparatus comprising a portion of the hydraulic apparatus of FIG. 10. The section is taken along a horizontal plane through the centerline of the apparatus; and FIG. 13 is a perspective view of the stationary packer apparatus of the preceding figures, said view showing the location of control panels on the apparatus.

Figure 1:
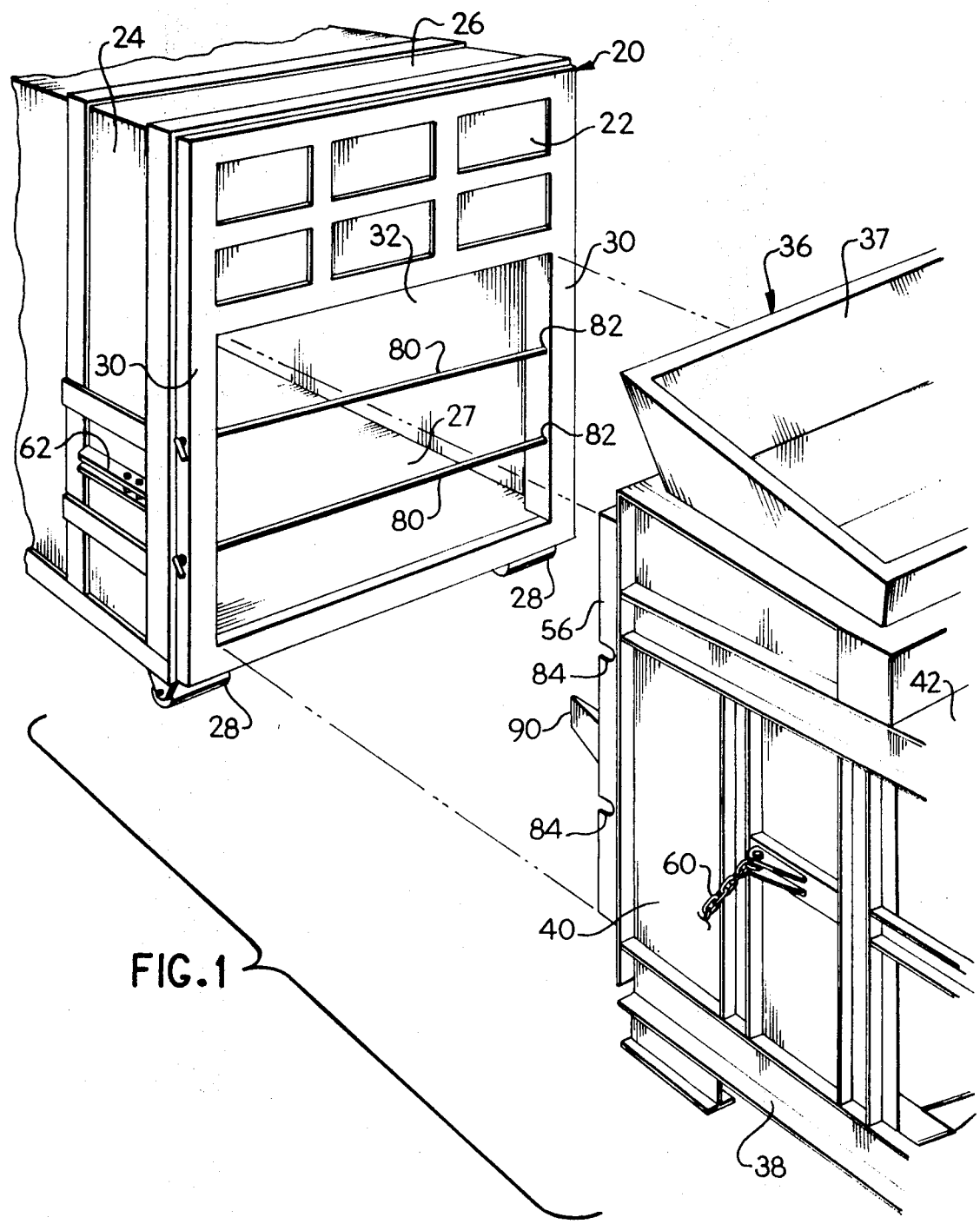
FIG. 1 is a partial perspective view showing a portable refuse container and associated packer apparatus constructed in accordance with the present invention, said container means and packer being disposed in a separated position prior to the coupling together of the two portions of the apparatus.

Referring in detail to the drawings, FIG. 1 illustrates a portable container means indicated generally at 20 which may be in the form of a drag-on type refuse packer body. Container means 20 includes a rear wall 22, side walls 24, top wall 26, and a bottom wall 27.

The container means further includes casters 28 which movably support the container as it is moved across the supporting surface or dragged onto a truck frame for the purpose of transporting same to the dumping site.

With continued reference to FIG. 1, container means 20 further includes upright frame members 30 which define a refuse-receiving or loading opening 32.

Figure 2:
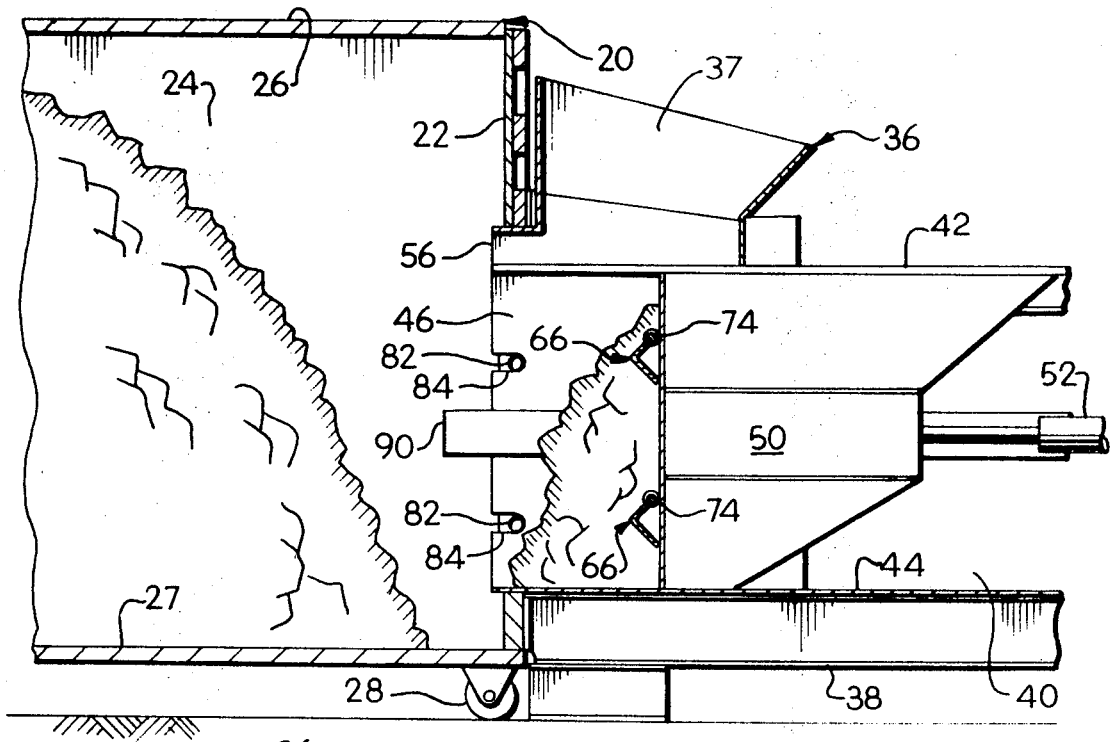
FIG. 2 is a partial side sectional view showing the apparatus of the preceding figures after the portable container means has been coupled to the stationary packer and with the ram in a retracted position.
Figure 3:
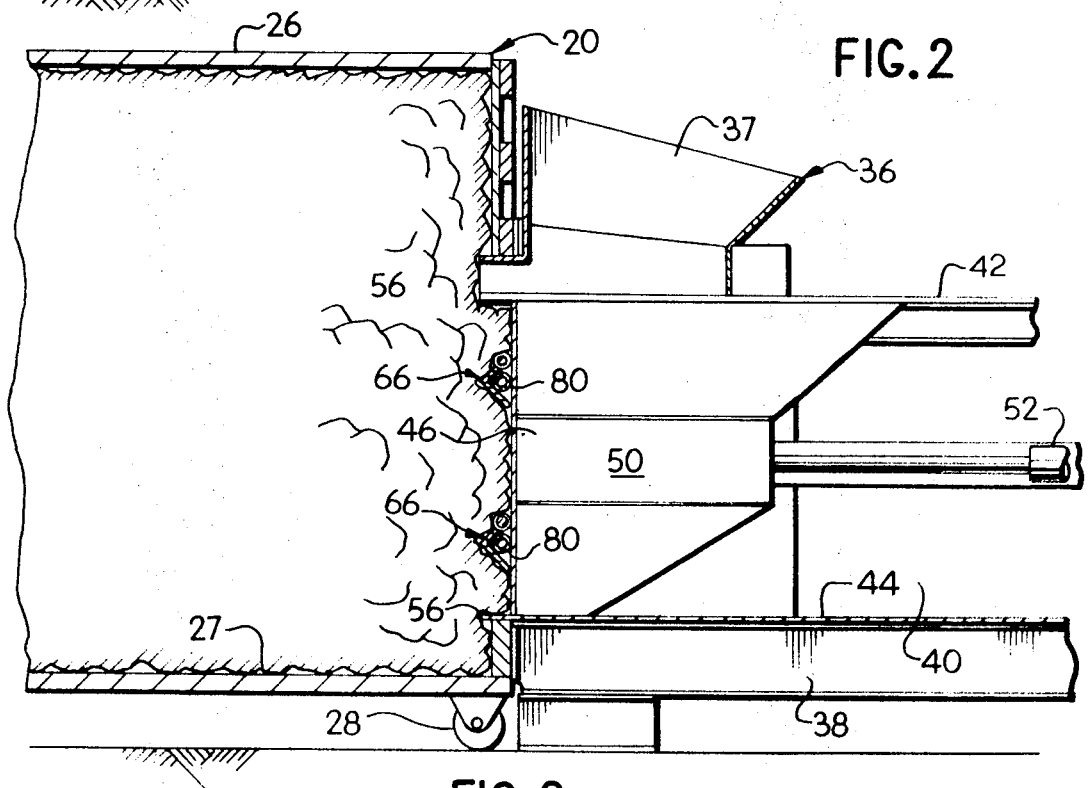
FIG. 3 is a partial side sectional view corresponding to FIG. 2 and showing the packer apparatus with the packer ram in an extended position.
Figure 4:
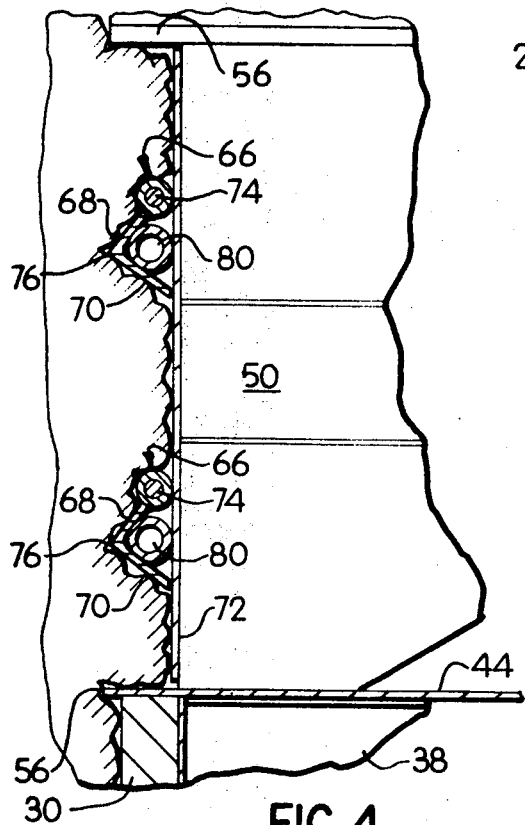
FIG. 4 is a partial side sectional view showing the junction of the container means and packer apparatus to which the load retaining means of the present invention has been applied.
Figure 5:
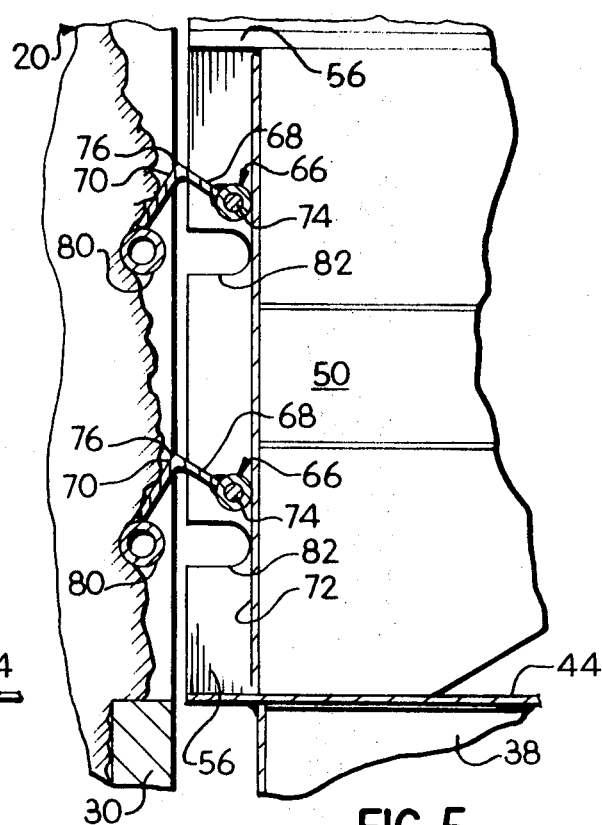
FIG. 5 is a partial side sectional view corresponding to FIG. 4 which shows the load retaining means in an open position.
Figure 6:
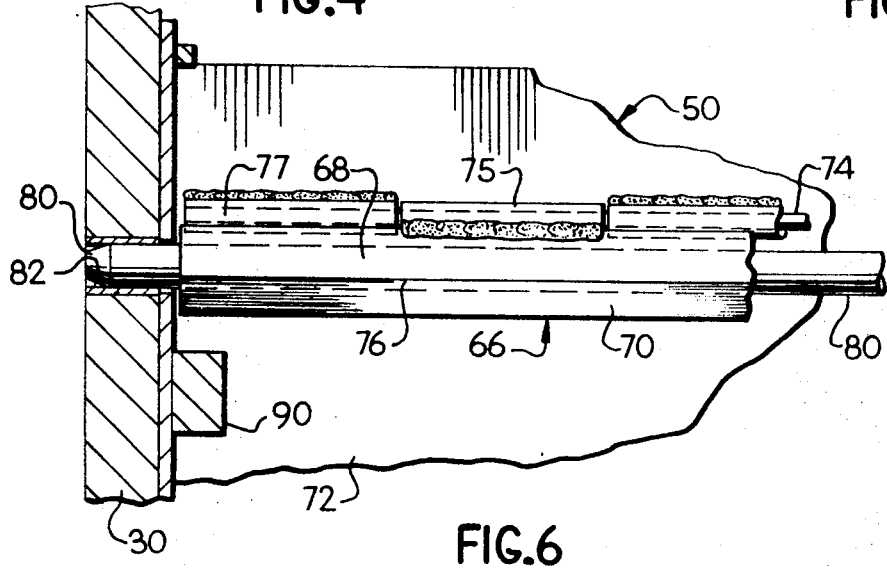
FIG. 6 is a partial front elevational view, partially in section, of the load retaining means of the preceding figures.
Figure 7:
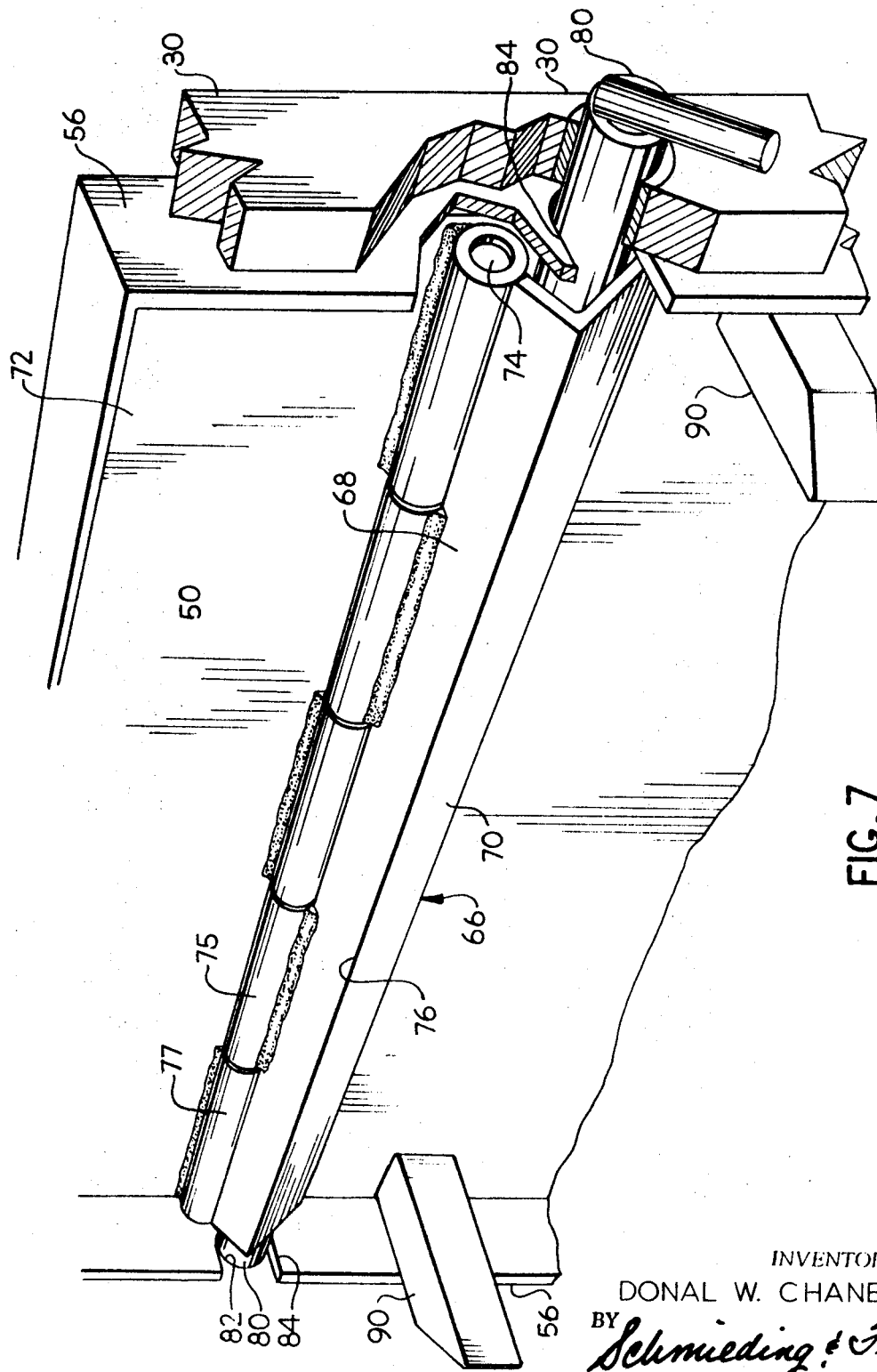
FIG. 7 is a broken perspective view showing the load retaining means in a closed position.

With reference to FIGS. 1 through 3, a stationary packer apparatus is indicated generally at 36 that includes a supporting frame 38, side walls 40, a top wall 42 and a bottom wall 44, said walls defining a passage 46 in which is reciprocatably mounted a packer ram indicated generally at 50.

As seen in FIGS. 2 and 3, packer ram 50 is reciprocated from the retracted position of FIG. 2 to the extended position of FIG. 3 by a suitable power means such as the hydraulic cylinder 52.

With continued reference to FIGS. 1 through 3, the top wall 42, bottom wall 44 and side walls 40 that form passageway 46 of the packer include end projections 56 that form flanges that fit closely with the inside of loading opening 32 of the container means 20.

As is best seen in FIGS. 2 and 3, it should be mentioned that container means 20 is coupled to packer apparatus 36 by chains 60 which attach to a bracket 62 by inserting a pin through holes in the bracket or by other suitable connecting means.

Referring next to FIGS. 4 through 7, the refuse retaining means is shown in enlarged detail and consists of a plurality of refuse engaging members indicated generally at 66 which are preferably of angular cross sectional shape that includes upper flanges 68 and lower flanges 70. Upper flange 68 is pivotally mounted to a front wall 72 of the ram at the hinge pin 74.

It will be noted that flanges 68 and 70 join at an apex 76 which faces forwardly with respect to the direction of extension of ram 50 so as to engage the refuse when container 20 is full, in the manner seen in FIG. 3.

The apparatus further includes a plurality of refuse retaining members 80 each of which is removably mounted in holes 82 which extend laterally through container frame members 30 seen in FIG. 1.

It should be mentioned that the edge flanges 56 of the passage side walls 40, FIG. 1 and FIG. 2, are provided with open-ended slots 84 which are aligned with the holes 82 of container side members 30 to permit insertion of the refuse retaining members 80.

It will now be understood that when the packer ram 56 is in the extended position of FIG. 3, then the refuse retaining member can be inserted into the mounting holes 82 in container frame member 30 and through the passage formed in front of the packer ram by the refuse engaging member 66, the latter serving to compress the refuse, at certain locations, inwardly of the holes 82 in container frame members 30.

It will further be understood that after refuse retaining members 80 are inserted into position, then packer ram 50 can be retracted whereby lower flanges 70 on refuse engaging member 66 are pivoted upwardly to an open position whereby said refuse engaging members 66 can move past retaining members 80.

With refuse engaging members 68 moved clear of retaining members 80 the fastening means 60–62 is next disconnected whereby portable container 20 can be moved away from packer apparatus 36.

It should further be mentioned that when an empty container is being attached to packer apparatus 36, a pair of spaced guides 90 function to precisely position opening 32 in the end wall of container means 20 so that the end flanges 56 of the packer 36 can slide into the opening.

Figure 9:
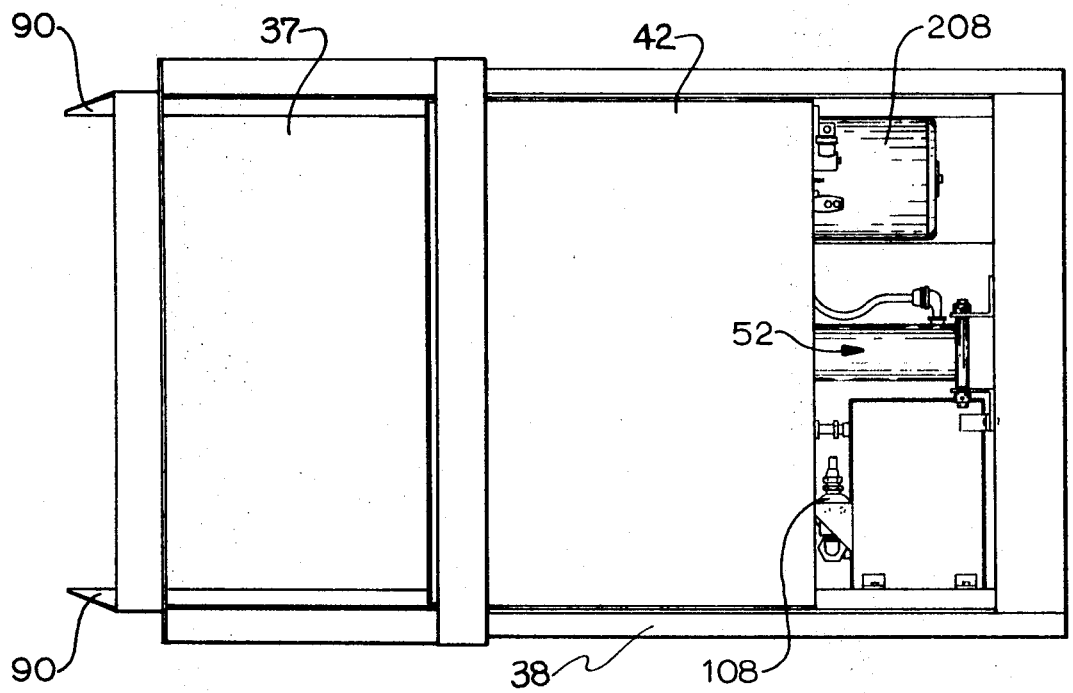
FIG. 9 is a plan view corresponding to FIG. 8.
Figure 8:
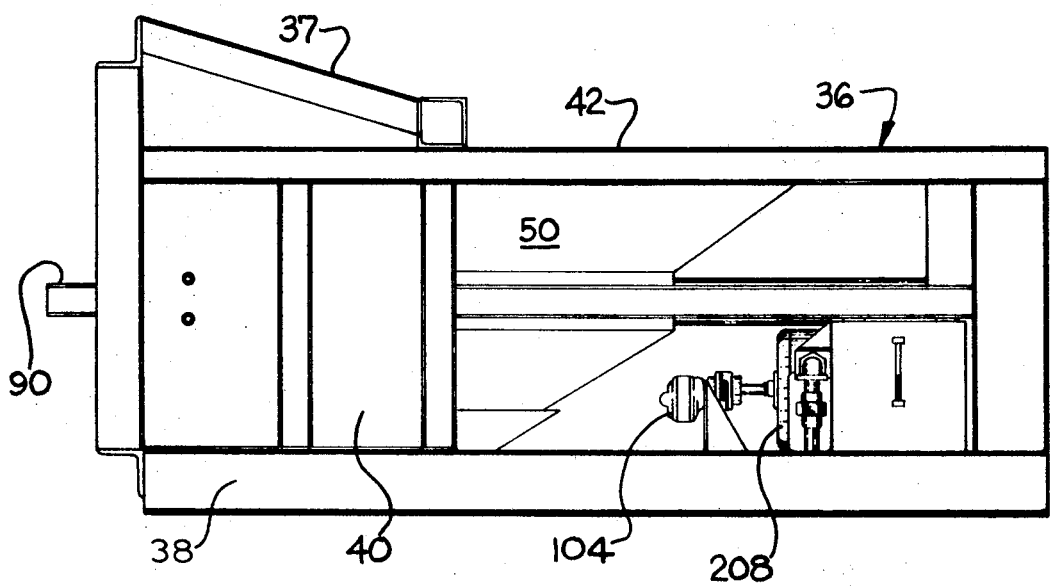
FIG. 8 is a side elevational view of the stationary packer apparatus of the preceding figures which shows a portion of the control apparatus of the present invention.

Reference is next made to FIGS. 8, 9, and 13 which illustrate the stationary packer portion of the apparatus with a portion of the hydraulic control system shown mounted thereon.

FIG. 10 is a diagrammatic view from which it will be seen that said control system includes a hydraulic reservoir 102 that supplies fluid to the inlet of a pump 104 via a line 106 and filter 108.

Pump 104 delivers hydraulic fluid to a normally open center four-way valve 110 via line 112 and a check valve 114.

With reference to valve 110 an inlet 116 of said valve can be selectively connected either with an inlet 120 of power cylinder or fluid motor 52 via a line 112 or with a second inlet 124 of said cylinder 52 via a line 126. When said first inlet 120 is connected with pressure line 112 the other inlet 124 of the motor is drained to a reservoir return line 130 by the position of the spool in valve 110. Similarly, when inlet 124 of fluid motor 52 is connected with pressure line 112 the other inlet 120 is drained to reservoir via line 122, valve 110 and reservoir return line 130.

It will be understood that pressurization of inlet 120 extends a rod 132 of fluid motor 52 and pressurization of the other inlet 124 serves to retract said rod 132.

Reference is next made to FIG. 10–A which illustrates, in enlarged detail, the internal components of valve 110 and pressure switches PS–1 and PC–2. When the machine is started solenoid 256 is energized lifting plunger 316 whereby a plunger groove 311 connects passages 300 and 301. Passage 301 is pressurized by cross-drilling in the housing that connects it with pressurized intake passage 376. Hence passages 300 and 301 conduct pressurized fluid to a chamber 344 at the right end 320 of the spool. Such pressurized spool end 302 shifts spool 304 to the left which connects line 122 with high pressure line 112 via housing passage 376, spool groove 306, housing passage 378, and line 122 to the extension side of cylinder 52. With the spool shifted to the left the other line 126 from the plunger side of cylinder 52 is connected to drain line 130 via housing passage 374 and spool recess 308. Hence it will be understood that such left spool position extends rod 132 of packing cylinder 52 thereby extending the packing ram 50 into force transmitting relationship with the load.

With continued reference to FIG. 10–A, and with spool 304 in the left position, when the pressurized end of cylinder 52 reaches a predetermined pressure value such pressure is transmitted to a chamber 386 of pressure switch PS–1 thereby raising switch actuating plunger 310 against the force of spring 332. Plunger 310 is thereby caused to actuate a switch 312 which disconnects contacts 8 and 9, FIG. 12, and connects contacts 8 and 14 which energize the other solenoid, FIG. 10–A.

Energization of solenoid 262 lifts plunger 314 which connects pressurized line 317 with line 318 thereby pressurizing chamber 348 and spool end 320 which shifts spool 304 to the right thereby connecting lines 126 and 112 via spool groove 308. This pressurizes the rod side of packing cylinder 52. At the same time spool 304 also connects lines 122 leading to the other end of cylinder 52 with drain line 130 via housing passage 378, spool groove 306 and housing passage 372. Hence with the spool in such right position it will be understood that the rod side of cylinder 52 is connected with pressure and the other end of the cylinder is connected with drain whereby rod 132 is retracted along with packing ram 50.

Upon the end of the retracting stroke of packing cylinder 52 the pressure in the left side of the cylinder and in line 126 builds up to a predetermined pressure value and such pressure is sensed in a chamber 282 of pressure switch PS-2 thereby raising plunger 330 against the action of spring 332. This actuates switch 344 braking contacts 15 and 16, FIG. 12, whereby movement of rod 132 of the packing cylinder terminates.

It should be mentioned that the above described operation FIG. 10-A, where movement of the packing cylinder terminates at the end of its retraction, occurs when panel switch 242 is set on the "jog" position. If, however, such switch is set on "auto" then the previously described pressure switch PS–1 is automatically reenergized at the end of the retraction of cylinder 52 and the cycle automatically starts over.

With continued reference to FIG. 10-A it should further be mentioned that when either of the solenoids 256 or 262 is deenergized its respective plunger 314 of 316 will be in the down position. When plunger 314 of the left solenoid 262 is in the down position, chamber 348 at the left spool end is connected via line 138 and plunger recess 313 to a drain passage 338 leading back to tank by means of cross drilled passages in the housing. Similarly, when plunger 316 of the other solenoid 256 is in the down position chamber 344 at the right spool end is connected to a drain passage 340 leading back to reservoir via line 300 and receses 311 in plunger 316. This permits oil to escape from the chambers 344 or 348 at the spool ends thereby permitting the shifting of spool 304.

As seen in FIG. 10A, a back pressure check valve 346 is provided in the body outlet port connected to return line 130 to maintain sufficient back pressure required to shift spool 304 against the force of spool centering springs 324.

The control system of FIG. 10 preferably includes a relief valve 134 downstream of the outlet of pump 104 and a by-pass flow return line 136 for returning the pump flow to reservoir in the event excessive pressures should develop in the system.

Figure 11:
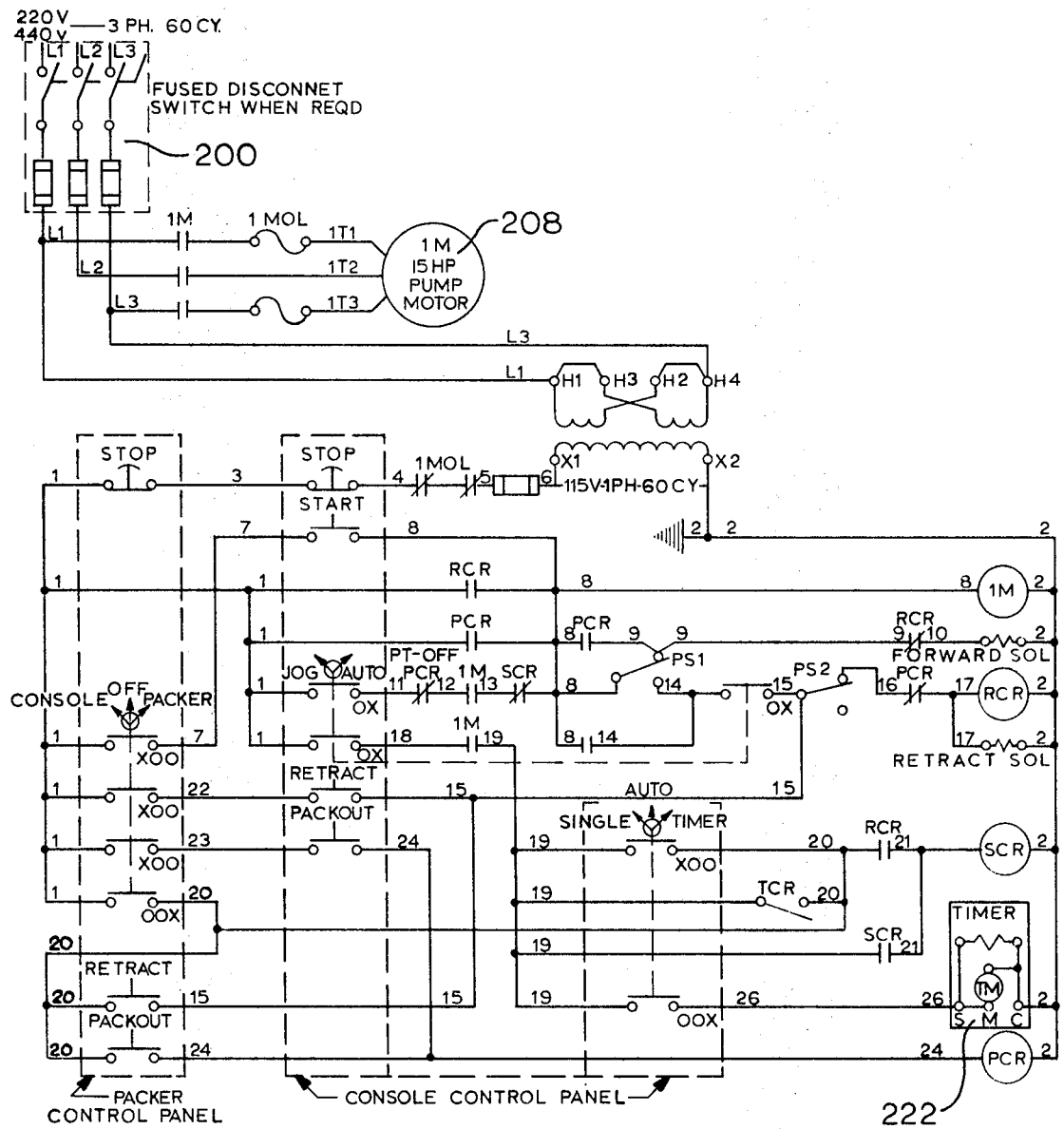
FIG. 11 is a diagrammatic view of a portion of an electrical apparatus forming a portion of the control system of the present invention.
Figure 12:
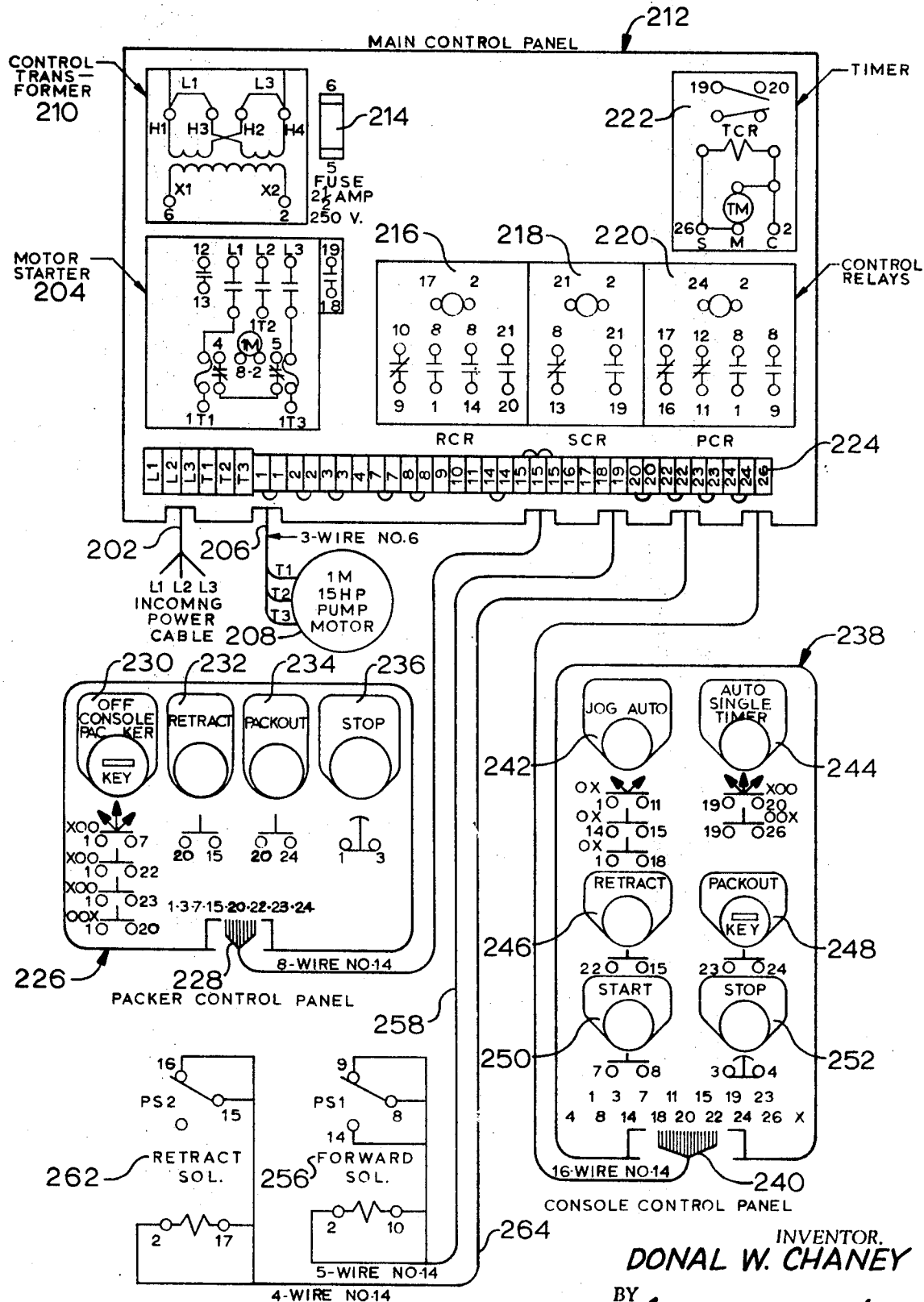
FIG. 12 is a diagrammatic view of a second portion of the electrical apparatus of FIG. 11.

Reference is next made to FIGS. 11 and 12 which are diagrammatic views of the electrical portion of the control system.

Referring to FIG. 11, it should be pointed out that the various symbols utilized therein are defined as follows:

Selector switch contacts

O=Contacts open
X=Contacts closed
OX=Open left and closed right position
OOX=Open in center and left, closed right position
XOO=Closed in left, open center and right positions Control relay contacts All Contacts shown de-energized

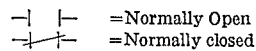
—| |— =Normally Open
—|—|— =Normally closed

Energizing a relay coil closes normally open contacts and opens normally closed contacts.

THE PACKER CONTROL SYSTEM IN GENERAL

The push button controls for operating the system are mounted on two separate panels. First, a packer control panel indicated generally at 226, FIGS. 12 and 13, is normally mounted on the drivers side of the container truck as seen in FIG. 13.

Secondly, a console control panel indicated generally at 238, FIGS. 12 and 13, may be installed at a remote location such as on the wall of a building or on a portable stand.

The packer control panel

The main packer control panel consists of the following four push buttons:

(1) A three position key lock type selector switch 230 which can be set in off, packer, or console positions. This switch commands both control panels 226 and 238 such that in the off position the packer cannot be operated. In the packer position the controls on packer panel 226 operate the packer and in the console positions the controls on the console panel operate the packer.

(2) A packout button—When this button is pushed forward motion of the packer ram 50 is started and continues as long as the button is depressed. Release of said packout button at any time stops the machine.

(3) A retract button—When this button is depressed retracting motion of packer ram 50 starts and continues to the rear end of the stroke where the ram stops automatically.

(4) A stop button—Any time this button is depressed movement of the packer ram 50 is stopped.

The console control panel

The console control panel consists of the following six push buttons:

(1) A start button 250
(2) A stop button 252
(3) A packout button 248
(4) A retract button 246
(5) A first selector switch 242 which can be set in jog or auto positions.
(6) A three position selector switch 244 which can be set in auto, single, and timer positions.

It should be noted that the two-position jog-auto switch 242 is set in the auto positions at all times except when jogging as later described.

Also it should be noted that the two-position selector switch 244 is usually set in the auto position when single or timer cycling is required. This selector switch 244 has no effect on the operation of the machine during jogging operations as later described.

It should also be pointed out, in particular, that when the keyed selector switch 230 on the packer control panel is set at the console position the following four types of cycling are available at the console control panel:

(1) Jog cycling—This is obtained by placing the jog-auto selector switch 242 in the jog position. Jogging operation of the ram is then obtained with the start, retract, and packout push buttons.

The three remaining types of cycling are obtained by setting the two-position selector switch 242 in the auto position and then selecting one of the below listed types of cycling with the three position selector switch 244. Pressing the start button then starts the one selected cycling as follows:

(2) Single cycling—The machine will run one complete cycle and stop automatically in the retracted position (3) Automatic cycling—The machine will run continuously until the stop button is depressed (4) Timer cycling—The machine will cycle automatically until stopped by an automatic timer as later described.

In general, it should be noted that with single cycling and timer cycling movement of packer ram 50 is always continued until the end of a retraction stroke before an automatic stop occurs. However, depression of the stop button will immediately stop movement of the packer ram at any existing position.

It should be further mentioned that unlocking and depressing packout button 248 during any of the above mentioned cycling will establish a packout, as later described, after which the machine will always automatically stop.

Referring in detail to FIGS. 11 and 12, the electrical system is connected to a power source as illustrated which is preferably of the 220 or 440 volt three phase 60 cycle type. The power enters the system at a fused disconnect switch 200 and then through incoming power cable 202, FIG. 12. Energizing the motor starter 204 supplies power through cable 206 to an electric motor 208, FIGS. 10 and 11, which motor drive the hydraulic pump 104 and fluid motor 52 in the manner previously described.

A control transformer 210 is energized through wires L1 and L3 from motor starter 204 to reduce control voltage to 110 volts.

Main control panel 212 houses motor starter 204, control transformer 210, fuse 214, control relays 216, 218, 220, timer 222 (timing range 1 to 30 minutes) and terminal block assembly 224.

Packer control panel 226, FIG. 12 is powered by an eight wire cable 228 and houses a three-position key lock type selector switch 230 marked console-off-packer, a push button 232 marked retract, a push button 234 marked packout, and a push button 236 marked stop.

Console control panel 238, FIG. 12, is powered by a sixteen wire cable 240 and houses a two-position selector switch 242 marked jog-auto, a three-position selector switch 244 marked single-auto-timer, a push button 246 marked retract, a key lock push button 248 marked packout, a push button 250 marked start, and a push button 252 marked stop.

Pressure switch PS-1 and forward solenoid 256 powered by a five wire cable 258 are installed on a hydraulic control valve 110, FIG. 10.

A pressure switch PS-2 and retract solenoid 262 are powered by a wire cable 264 installed on hydraulic control valve 110, FIG. 10.

PACKER CONTROL PANEL OPERATION

With reference to the packer control panel 226, FIG. 12, selector switch 230 is set at its packer position.

The two-position selector switch 242 on console control panel 238 is set at its auto position.

The position of three-position selector switch 244 is immaterial.

When packout button 234 is depressed it energizes coil of relay 220 (PCR) at wires 24 and 2 closes contracts PCR at wires 1 and 8 and 8 and 9 thereby energizing coil 1M of motor starter 204 at wires 8 and 2. This closes contacts 1M in motor starter 204 which starts motor 208 and energizes forward solenoid 256 of valve 110 at the wires 10 and 2. This pressurizes port 120 of fluid motor 52 thereby starting forward motion of packing ram 50.

It should be mentioned that any time packout button 234 is released the machine is stopped.

With reference to the retract button 232 of the packer control panel, when this button is depressed it energizes the coil of relay 216 (RCR) and retracting solenoid 262 of valve 110 at wires 17 and 2 closing contacts RCR at wires 1 and 8 thereby energizing coil 1M of motor starter 204 at wires 8 and 2. This closes contacts 1M in motor starter 204 thereby starting motor 208 which causes pressurization of port 124 of fluid motor 52, FIG. 10, thereby starting retracting motion of packer ram 50.

It should be pointed out that such retracting motion of packing ram 50 coninues to the end of the retracting stroke where the ram stops automatically even though retracting button 232 has been released.

CONSOLE CONTROL PANEL OPERATION

Reference is next made to operation of console control panel 238, FIG. 12, where four types of cycling are available. Console control panel 238 is put into operation by moving selector switch 230 on packer control panel 236 to the console position.

(1) Jogging operation (a) Jog forward—Depressing start button 250 energizes coil 1M of motor starter 204 at wires 8 and 2 closing contacts 1M in motor starter 204 which starts motor 208 and energizes forward solenoid 256 of valve 110 at wires 10 and 2. Releasing start button 250 stops the machine whereas holding this button depressed at the forward end of the stroke of packing ram 50 causes the ram to agitate without exerting packout force.

(b) Packout jog forward—When packout button 248 is depressed it energizes the coil of relay 220 (PCR) at wires 24 and 2 closing contacts PCR at wires 1 and 8 and 8 and 9 thereby energizing coil 1M of motor starter 204 at wires 8 and 2. This closes contacts 1M in motor starter 204 starting motor 208 and energizes forward solenoid 206 of valve 110 at wires 10 and 2 thereby pressurizing inlet 120 of fluid motor 52 which starts forward motion of packing ram 50. Releasing packout button 248 stops the machine whereas holding such packout button depressed at the end of the forward stroke of ram 50 holds such blade in a force exerting position at the forward end of its stroke.

(c) Jog retract—When retract button 246 is depressed this energizes the coil of relay 216 (RCR) and retracting solenoid 262 of valve 110 at wires 17 and 2 thereby closing contacts RCR at wires 1 and 8 which energized coil 1M of motor starter 204 at wires 8 and 12. this closes contacts 1M in the motor starter which effects starting of motor 208. Inlet 124 of fluid motor 52 is thereby pressurized which starts retracting motion of packing ram 50. Releasing retract button 246 stops the machine whereas holding such button depressed at the end of the retracting stroke causes packing ram 50 to agitate.

(2) Single cycling

When start button 250 is depressed it energizes coil 1M of motor starter 204 at wires 8 and 2 closing contacts 1M in motor starter 204 thereby starting motor 208. Contacts 1M at wires 18 and 19 also close to provide the set up circuit for the type of cycling selected with three-position selector switch 244. Forward solenoid 256 is also energized at wires 10 and 2 starting forward motion of packing ram 50 which continues until the hydraulic system of FIG. 10 builds up pressure to the preselected setting of pressure switch PS-1 at wires 8, 9, and 14. The contacts 8 and 9 in switch PS-1 open thereby deenergizing forward solenoid 256 at wires 10 and 2 thereby stopping forward motion of packing ram 50. When contacts 8 and 14 in pressure switch PS-1 close momentarily, after contacts 8 and 9 open, this energizes the coil of relay 216 (RCR) at wires 17 and 2 closing the contacts RCR at wires 1 and 8, 8 and 14, and 20 and 21, and opening contacts at wires 9 and 10 thereby providing for resetting of pressure switch PS-1. Closing of contacts RCR at wires 1 and 8, and 8 and 14 set up holding circuits.

The coil of relay 218 (SCR) is energized at wires 21 and 2. Contacts SCR at 13 and 8 are opened and contacts SCR at wires 19 and 21 are closed providing a holding circuit for relay 218 (SCR). Retract solenoid 262 is also energized at wires 17 and 2, at the same time as relay 216 RCR, thereby pressurizing port 124 of the fluid motor to start retracting motion of packer ram 50. Such motion will continue to the end of the retracting stroke and the hydraulic system of FIG. 10 builds up pressure to the predetermined setting of pressure switch PS-2 at wires 15 and 16. This deenergizes the coil of relay 216 (RCR) at wires 17 and 2. Also, the retract solenoid 262 is deenergized along with coil 1M of mirror starter 204 and the coil of relay 218 (SCR) which automatically stops movement of the packer ram at the end of one single cycle.

(3) Automatic cycling

Automatic cycling operation is effected in the same manner as set forth in the first paragraph of the above single cycling description except that three-way selector switch 244 is set on the auto position which changes the operation as follows. Retract solenoid 262 is thereby energized at wires 17 and 2 at the same time the coil of relay 216 (RCR) to start retracting motion of packing ram 50. Motion of the ram continues to the end of the retracting stroke and hydraulic system of FIG. 10 builds up pressure to the setting of pressure switch PS-2 at wires 15 and 16 thereby deenergizing the relay of coil 216 (RCR) at wires 17 and 2 and retract solenoid 262 at wires 17 and 2.

A new cycle is started automatically through a holding circuit that was set up when the machine was originally started. Such holding circuit is established via wires 1, 11, 12, 13, and 8 through contacts 8 and 9 in pressure switch PS–1 which energized forward solenoid 256 at wires 10 and 2. This pressure switch PS–1 was reset after forward motion of packer ram 50 stopped at previously described.

(4) Timer cycle

Reference is next made to a timer 222 in main control panel 212 for a predetermined time interval of packer operation as may be desired.

Time cycling is then obtained electrically in the same manner as automatic cycling described above except that selector switch 244 is positioned at its timer position.

The electrical circuitry is switched to single cycle configuration by the timer 222 at the end of the selected time period.

The time cycling is started with start button 250 and proceed exactly as automatic cycling except that timer 222 is energized at wires 26 and 2 through contacts and wires 19 and 26 in selector switch 244. Since an "off delay" type of timer is used contacts 19 and 20 in said timer will close at the end of the preselected time period to set up the single cycle sequence. Hence packer ram 50 will always complete a cycle in existence. As the retracting portion of an existing cycle starts a circuit is completed through wires 19, 20, and 21 which energizes the coil of relay 218 (SCR) the wires 21 and 2 closing contacts SCR at wires 19 and 21 thereby providing a holding circuit for the resetting of timer 222. Contacts SCR at wires 13 and 8 are always opened to stop packer ram 50 at the end of its retracting motion.

FORWARD, PACKOUT AND RETRACT OPERATION WITHOUT JOG

To achieve this type of operation selector 230 on the packer control panel is set at console, two position selector switch 242 is set at auto, and three position selector switch 244 is set at single.

Depressing start button 250 will cycle the machine through one complete cycle and stop automatically.

Automatic cycling without jog is achieved by changing selector switch 244 to auto and by depressing start button 250 of the console panel which will cycle the machine automatically until either stop button 252 on the console panel or stop button 236 on the main packer control panel are depressed. For the details of operation see automatic cycling described above.

Packout operation without jog is achieved by depressing start button 248 of the console panel while packer ram 50 is retracted or during forward and retracting motion. This will cause the machine to go through a packout operation and automatically stop. The coil of relay 220 (PCR) is energized at wires 24 and 2 and closes contacts PCR at wires 1 and 8 and 8 and 9. This energizes the forward solenoid 256 at wires 10 and 2, the two number 9 wires by-pass the reversing pressure switch PS–1 which attains packout as long as the packout button 248 is held depressed. Upon releasing packout button 248 the machine stops which stopping action is obtained by the contacts PCR at wires 11 and 12 and 16 and 17 which were opened when the coil of relay 220 PCR was energized as described above.

Retract operation without jog is obtained by depressing and releasing the retract button 246 during forward motion or at the end of the packout cycle (extended position) which causes retracting motion of packer ram by energizing coil of relay 216 (RCR) and retracting solenoid 262 at wires 17 and 2. Relay contacts RCR at wires 1 and 8 close energizing coil 1M of motor starter 204 which starts motor 208. Contacts RCR at wires 8 and 14 also close providing a holding circuit for retracting motion so that retracting button 246 can be released. Contact RCR at wires 20 and 21 also close and energize coil of relay 218 at wires 21 and 2. This opens contacts at wires 13 and 8 to stop the machine at the end of retracting motion of packer ram 52. Retracting motion will continue to the end of the stroke at which time the machine's hydraulic system of FIG. 10 builds up pressure to the setting of pressure switch PS–2 at wires 15 and 16 deenergizing the coil of relay 216 RCR at wires 17 and 2 and retract solenoid 262 at wires 17 and 2. The contacts of relay 216 RCR at wires 1 and 8 and 8 and 14 and 20 and 21 are opened to stop the machine.

I claim:

1. A stationary refuse packer and associated container apparatus comprising, in combination, portable container means including a container opening in a wall thereof; stationary packer apparatus including a packer frame means defining a refuse receiving passage having a refuse discharge opening; means for detachably connecting said container means to said packer frame means with said container opening communicating with said refuse discharge opening; a packer ram mounted for reciprocation in said passage between a retracted position wherein said passage is loaded and an extended position wherein a front end of said ram is adjacent said container opening; a fluid motor including a "forward" direction of operation for extending said packer ram and a reverse direction of operation for retracting said packer ram; means forming a source of pressurized fluid for operating said fluid motor; flow control valve means including an open position for the flow of fluid from said pump to said reservoir, an "extend" position for a first flow of fluid from said pump to one side of said motor whereby said ram is extended, and a "retract" position for a second flow of fluid from said pump to the other side of said fluid motor whereby said ram is retracted; a pressure responsive controller exposed to certain of said flows for automatically shifting said valve means between certain of said positions responsive to a predetermined fluid pressure in said certain flows; a packer control means comprising a main switch means including an "off" position and a "packer" position, a packout switch means including a deactuated position and an actuated position that energizes said fluid motor and extends said ram when said main switch means is in said "packer" position, said fluid motor being deenergized when said packout switch means is moved to said deactuated position; a retract switch means including a deactuated position and an actuated position which energizes said fluid motor and starts retracting movement of said ram when said main switch means is in said "packer" position, said fluid motor remaining energized until said ram reaches said retracted position; and a stop switch means including a deactuated position and a "stop" position movement of said stop switch means to said "stop" position serving to at anytime deenergize said fluid motor and stop said ram.

2. A stationary refuse packer and associated container apparatus comprising, in combination, portable container means including a container opening in a wall thereof; stationary packer apparatus including a packer frame means defining a refuse receiving passage having a refuse discharge opening; means for detachably connecting said container means to said packer frame means with said container opening communicating with said refuse discharge opening; a packer ram mounted for reciprocation in said passage between a retracted position wherein said passage is loaded and an extended position wherein a front end of said ram is adjacent said container opening; a fluid motor including a "forward" direction of operation for extending said packer ram and a "reverse" direction of operation for retracting said packer ram; means forming a source of pressurized fluid for operating said fluid motor; flow control valve means including an open position for the flow of fluid from said pump to said reservoir, an "extend" position for a first flow of fluid from said pump to one side of said motor whereby said ram is extended, and a "retract" position for a second flow of fluid from said pump to the other side of said fluid motor whereby said ram is retracted; a pressure responsive controller exposed to certain of said flows for automatically shifting said valve means between certain of said positions responsive to a predetermined fluid pressure in said certain flows; a main packer control means comprising a main switch means including an "off" position, a "packer" position and a "console" position; a packout switch means for controlling forward movement of said packer ram when said main switch means is in said "packer" position, a retract switch means for controlling retracting movement of said packer ram when said main switch means is in said "packer" position, and a stop switch means for at anytime stopping movement of said ram; a console control means including a start switch means including deactuated and actuated positions, moving said start switch to said actuated position causing forward movement of said ram, releasing said start switch means serving to deenergize said fluid motor and stop movement of said ram, and maintaining said start switch actuated when said ram is in a forward position serving to cause said ram to agitate without exerting packing force; a console packout switch means including deactuated and actuated positions, moving said console packout switch means to said actuated position causing forward movement of said ram, releasing said console packout switch means serving to deenergize said fluid motor and stop movement of said ram, and maintaining said console packout switch actuated when said ram is in a forward position serving to maintain said ram in a forward force exerting position; and a console retract switch means including deactuated and actuated positions, moving said console retract switch means to said actuated position causing retracting movement of said ram, and releasing said console retract switch means serving to deenergize said fluid motor and stop movement of said ram.

3. The apparatus defined in claim 2 wherein said console control means comprises a console selector switch means movable to "single cycle" position wherein movement of said console start switch means to said actuated position causes extension of said ram to said extended position, then automatic retraction of said ram to said retracted position and automatic stopping of said ram at said retracted position.

4. The apparatus defined in claim 2 wherein said console control means comprises a console selector switch means movable to an "auto cycle" position wherein movement of said console start switch to said actuated position causes extension of said ram to said extended position, then retraction of said ram to said retracted position, and then automatic recycling of said ram through said positions for repeated cycles.

5. The apparatus defined in claim 2 wherein said console control means includes a control selector switch means movable to a "timer" position wherein movement of said console start switch means to said actuated position causes said ram to move through repeated cycles; and timer means for stopping said ram in a retracted position after a predetermined period of time.

6. The apparatus defined in claim 2 wherein said console control means includes a first control selector switch means movable to an "auto" position and a second control selector switch means movable to an "auto" position, movement of said console start switch means to said actuated position, with said two control selector switch means in their respective "auto" positions, causing said ram to cycle automatically; and a console stop switch means for stopping movement of said ram at anytime during said cycling.

7. The apparatus defined in claim 2 wherein said console control means includes a first control selector switch means movable to an "auto" position and a second control selector switch means movable to an "auto" position, movement of said console packout switch means to said actuated position, with said two control selector switch means in their respective "auto" positions, causing said ram to extend, packout and then stop.

8. The apparatus defined in claim 2 wherein said console control means includes a control selector switch means movable to a "jog" position wherein said console start switch means causes said ram to move to said extended position and stop at said extended position without exerting packing force, and wherein said console packout switch means causes said ram to extend to a forward force exerting position, and wherein said console retract switch means causes said ram to move to said retracted position and stop.

9. A stationary refuse packer apparatus comprising, in combination, packer frame means defining a passage provided with a refuse receiving opening and a refuse discharge opening; a packer ram mounted for reciprocation in said passage between a retracted position wherein said passage is loaded and an extended position wherein a front end of said ram is in compacting engagement with said refuse; a fluid motor for extending and retracting said packer ram; a pump for delivering pressurized fluid to said fluid motor; a reservoir for fluid released from said fluid motor; flow control valve means including an open position for the flow of fluid from said pump to said reservoir, an "extend" position for a first flow of fluid from said pump to one side of said motor whereby said ram is extended, and a "retract" position for a second flow of fluid from said pump to the other side of said fluid motor whereby said ram is retracted; a pressure responsive controller exposed to certain of said flows for automatically shifting said valve means between certain of said positions responsive to a predetermined fluid pressure in said certain flows; manual control means for said valve means including a start switch means for manually starting and stopping forward movement of said ram, a retract switch means for manually starting and stopping retracting movement of said ram; and selector switch means movable to an "auto cycle" position wherein said pressure responsive controller automatically recycles said ram, and to a position wherein said manual control means controls the position of said ram.

10. A stationary refuse packer apparatus comprising, in combination, packer frame means defining a passage provided with a refuse receiving opening and a refuse discharge opening; a packer ram mounted for reciprocation in said passage between a retracted position wherein said passage is loaded and an extended position wherein a front end of said ram is in compacting engagement with said refuse; a fluid motor for extending and retracting said packer ram; a pump for delivering pressurized fluid to said fluid motor; a reservoir for fluid released from said fluid motor; flow control valve means including an open position for the flow of fluid from said pump to said reservoir, an "extend" position for a first flow of fluid from said pump to one side of said motor whereby said ram is extended, and a "retract" position for a second flow of fluid from said pump to the other side of said fluid motor whereby said ram is retracted; a first pressure responsive controller exposed to said first flow for automatically shifting said valve means from said "extend" position to said "retract" position, responsive to a predetermined fluid pressure in said first flow; a second pressure responsive controller exposed to said second flow for automatically shifting said valve means from said "retract" position to said "extend" position responsive to a predetermined fluid pressure in said second flow; manual control means for said valve means including a start switch means for manually starting and stopping forward movement of said ram, a retract switch means for manually starting and stopping retracting movement of said ram; and selector switch means movable to an "auto cycle" position wherein said pressure responsive controller automatically recycles said ram, and to a position wherein said manual control means controls the position of said ram.

References Cited

UNITED STATES PATENTS

| | | | |
|---|---|---|---|
| 3,229,618 | 1/1966 | O'Connor | 100—51 |
| 3,231,107 | 1/1966 | Clar | 100—52UX |
| 3,250,414 | 5/1966 | Pioch | 100—52UX |
| 3,318,231 | 5/1967 | Felts | 100—52 |
| 3,327,620 | 6/1967 | Cole | 100—52 |
| 3,368,478 | 2/1968 | Clar | 100—50 |

BILLY J. WILHITE, Primary Examiner

U.S. Cl. X.R.

100—53, 229, 269